J. Lafetra,
Bread Machine,

N° 83,069. Patented Oct. 13, 1868.

Witnesses:
G. C. Cotton
Alex F. Roberts

Inventor:
J. Lafetra,
per Munn & Co.
Attorneys

JAMES LAFETRA, OF NEW YORK, N. Y.

Letters Patent No. 83,069, dated October 13, 1868.

IMPROVED CAKE-MIXER.

The Schedule referred to in these Letters Patent and making part of the same.

*To all whom it may concern:*

Be it known that I, JAMES LAFETRA, of the city, county, and State of New York, have invented a new and improved Cake-Mixer; and I do hereby declare that the following is a full, clear, and exact description thereof, which will enable others skilled in the art to make and use the same, reference being had to the accompanying drawings, forming part of this specification.

Similar letters of reference indicate corresponding parts.

Figure 3:
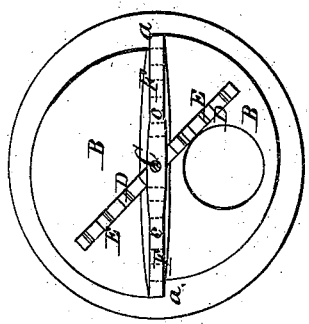
Figure 3 is an inverted plan view of the upper part of the same.
Figure 2:
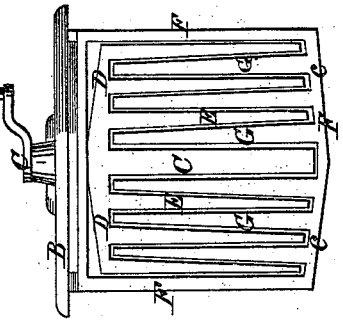
Figure 2 is a side view of the upper part of the same.

This invention relates to a new apparatus for mixing the material for making cake of all kinds, the object of the invention being to quicken the stirring-process.

The invention consists in the use of two-fingered stirrers, suspended from the cover of a tub, one of the stirrers being stationary and the other rotating. The stationary fingers project upward from the lower bar of a yoke, and the rotating fingers project downward from a cross-bar that is attached to a shaft having its bearings in the aforesaid cover. The rotating fingers pass between the stationary fingers, and keep the contents of the tub well stirred. When the cover is taken off, the whole apparatus will be taken out of the tub, and there will be nothing in the way to prevent the cleaning of the tub or the further manipulation of the mixture.

A, in the drawings, represents a cylindrical or other upright tub, made of wood, or other suitable material.

B is the cover of the tub. The same is provided with lugs or shoulders, *a*, that fit against lugs or shoulders, *b*, of the tub, so that, by this or other suitable means, the cover is prevented from turning on the tub.

In the centre of the cover is arranged the journal for a vertical shaft, C, which shaft carries a cross-bar, D, from which tapering or other fingers, E E, are suspended, as shown.

F is a yoke, suspended from the cover B.

The lower end of the shaft C rests on a socket formed in the lower horizontal bar, *c*, of the yoke.

Figure 1:
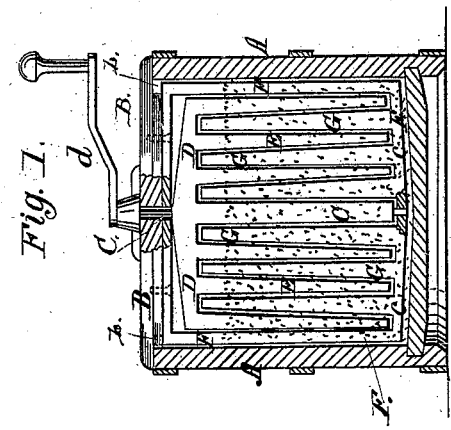
Figure 1 represents a vertical sectional view of my improved cake-mixer.

This bar *c* rests, when the cover is closed, nearly or wholly on the bottom of the tub, as indicated in fig. 1.

From the bar *c* of the yoke F project upward fingers G G, as shown, said fingers fitting between those of the shaft, as shown.

When rotary motion is imparted to the shaft either by turning a crank, *d*, or by any other suitable means, the fingers E E will be carried through the contents of the box, and also between the fingers G, thereby well stirring the contents, and throwing them against the said fingers G.

When the tub is to be emptied, the cover is taken off with all its appendages.

The cover may be perforated to allow the inspection of the contents and the addition of the ingredients. This aperture may be closed by a separate lid.

Having thus described my invention,

What I claim as new, and desire to secure by Letters Patent, is—

The arrangement of the beater D E, and the quadrangular yoke F, bearing the standing fingers G, suspended from the cover B, in such a manner that the beater is permitted to revolve while the yoke F and its fingers remain stationary, as herein described, for the purpose specified.

JAMES LAFETRA.

Witnesses:
FRANK BLOCKLEY,
ALEX. F. ROBERTS.